(12) United States Patent
Agbor

(10) Patent No.: US 8,478,682 B2
(45) Date of Patent: Jul. 2, 2013

(54) SYSTEM FOR TRADING ILLIQUID ASSETS BY LIQUIDITY PROVISIONING AND BID VALUE SWAP (FINANCIAL CONDUCTIVITY)

(76) Inventor: Napoleon Enompang Agbor, Middlesex (GB)

(*) Notice: Subject to any disclaimer, the term of this patent is extended or adjusted under 35 U.S.C. 154(b) by 46 days.

(21) Appl. No.: 13/309,122

(22) Filed: Dec. 1, 2011

(65) Prior Publication Data

US 2012/0150714 A1   Jun. 14, 2012

Related U.S. Application Data

(60) Provisional application No. 61/422,082, filed on Dec. 10, 2010.

(51) Int. Cl.
*G06Q 40/00* (2012.01)
(52) U.S. Cl.
USPC .......................................... 705/37; 705/36 R
(58) Field of Classification Search
USPC ...................................................... 705/35–37
See application file for complete search history.

(56) References Cited

U.S. PATENT DOCUMENTS

| | | | |
|---|---|---|---|
| 7,567,928 B1 | 7/2009 | Oaten et al. | |
| 7,685,056 B2 | 3/2010 | Menon | |
| 7,747,502 B2 * | 6/2010 | Arnott et al. | 705/36 R |
| 7,770,184 B2 | 8/2010 | Miller et al. | |
| 7,882,011 B2 | 2/2011 | Sandhu | |
| 7,882,019 B2 | 2/2011 | Toffey | |
| 7,895,118 B2 | 2/2011 | Glodjo et al. | |
| 2004/0054613 A1 * | 3/2004 | Dokken | 705/36 |
| 2004/0148247 A1 | 7/2004 | Miller et al. | |
| 2007/0282734 A1 | 12/2007 | Huntley et al. | |
| 2008/0120245 A1 * | 5/2008 | Humphreys et al. | 705/36 R |
| 2009/0089202 A1 | 4/2009 | Rowley | |
| 2009/0254474 A1 * | 10/2009 | Gladstone | 705/37 |
| 2010/0191636 A1 | 7/2010 | Menon | |
| 2011/0071941 A1 | 3/2011 | Marcaide | |
| 2011/0178913 A1 | 7/2011 | Smith | |

OTHER PUBLICATIONS

R Cifuentes, G Ferrucci, HS Shin "Liquidity Risk and Contagion", Journal of the European Economic Association, 2005.*
George-Marios Angeletos etal. "The Hyperbolic Consumption Model: Calibration, Simulation, and Empirical Evaluation" Journal of Economic Perspectives—vol. 15, No. 3, summer 2011, pp. 47-68.*

* cited by examiner

*Primary Examiner* — Hani M Kazimi
(74) *Attorney, Agent, or Firm* — Steven A. Nielsen; Allman & Nielsen, P.C.

(57) ABSTRACT

Systems and methods that use provisions or infusions of liquid assets to facilitate multiparty trades wherein the provisioned liquid assets are sometimes infused into the host illiquid assets to create new semi-liquid or infused assets.

6 Claims, 12 Drawing Sheets

Illustration of a Bilateral Bid Value Swap Engine.

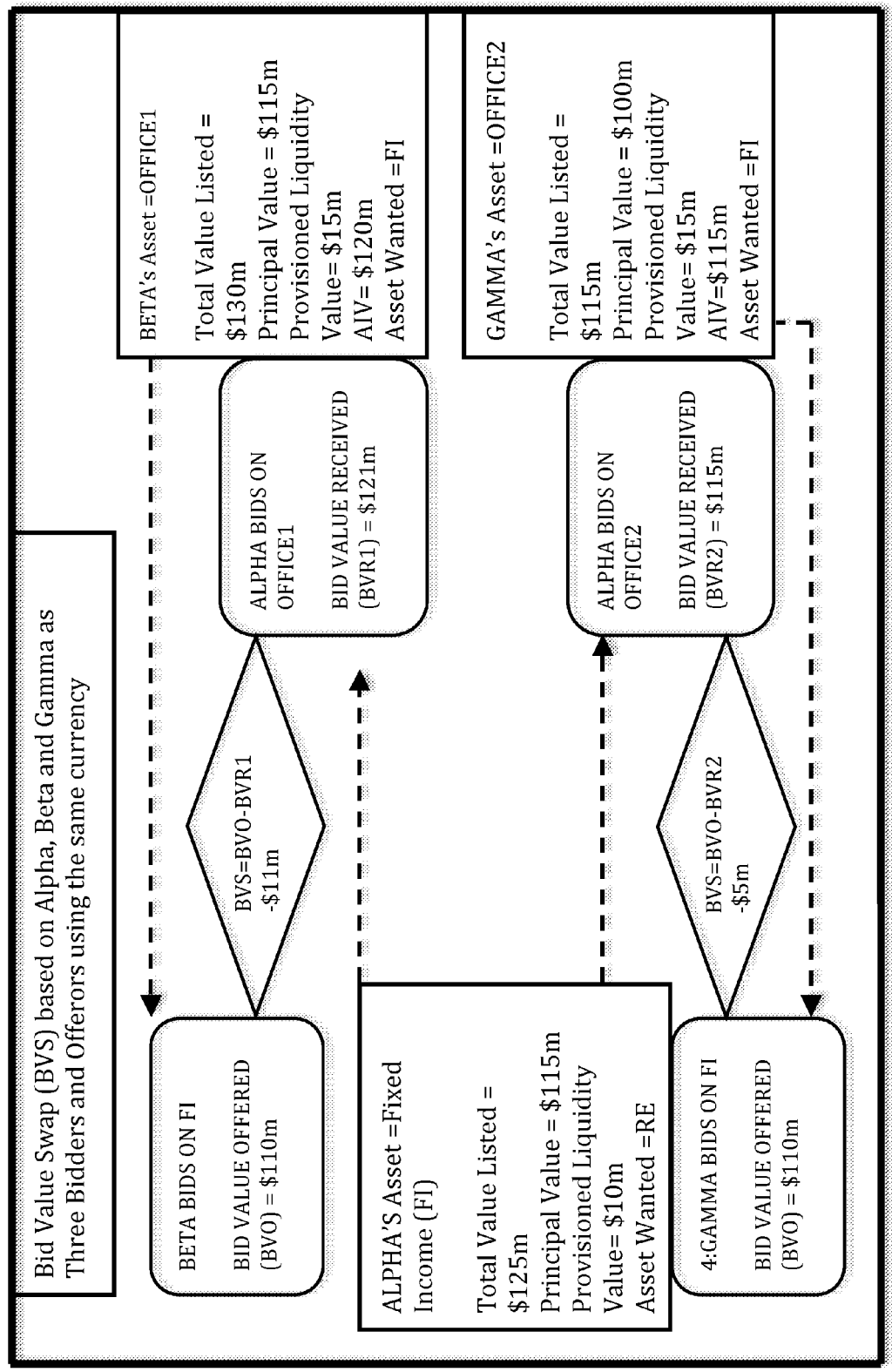
FIG. 1A: Illustration of a Bilateral Bid Value Swap Engine.

FIG. 1B: Trader's view, in table form of a 2-way BID VALUE SWAP TRADING platform

| Market Category | Product Code | Principal Value | Provisioned Liquidity Value | Total Value Listed | Average Independent Value [AIV] | Asset Wanted | BVO | BVR | BVS ▽ | Bid Closing Date |
|---|---|---|---|---|---|---|---|---|---|---|
| FIXED INCOME | Alpha | $115m | $10m | $125m | $100m | OFFICE 2 | $115m | $110m, | $5m | 1st Jan 2012 |
| OFFICE 1 | Beta | $115m | $15m | $130m | $120m | OFFICE 1 | $121m | $110m | $11m | 31st Dec. 2011 |
| | | | | | | FIXED INCOME | $110m | $121m | -$11m | |
| OFFICE 2 | Gamma | $100m | $15m | $115m | $115m | FIXED INCOME | $110m | $115m | -$5m | 2nd Feb 2012 |

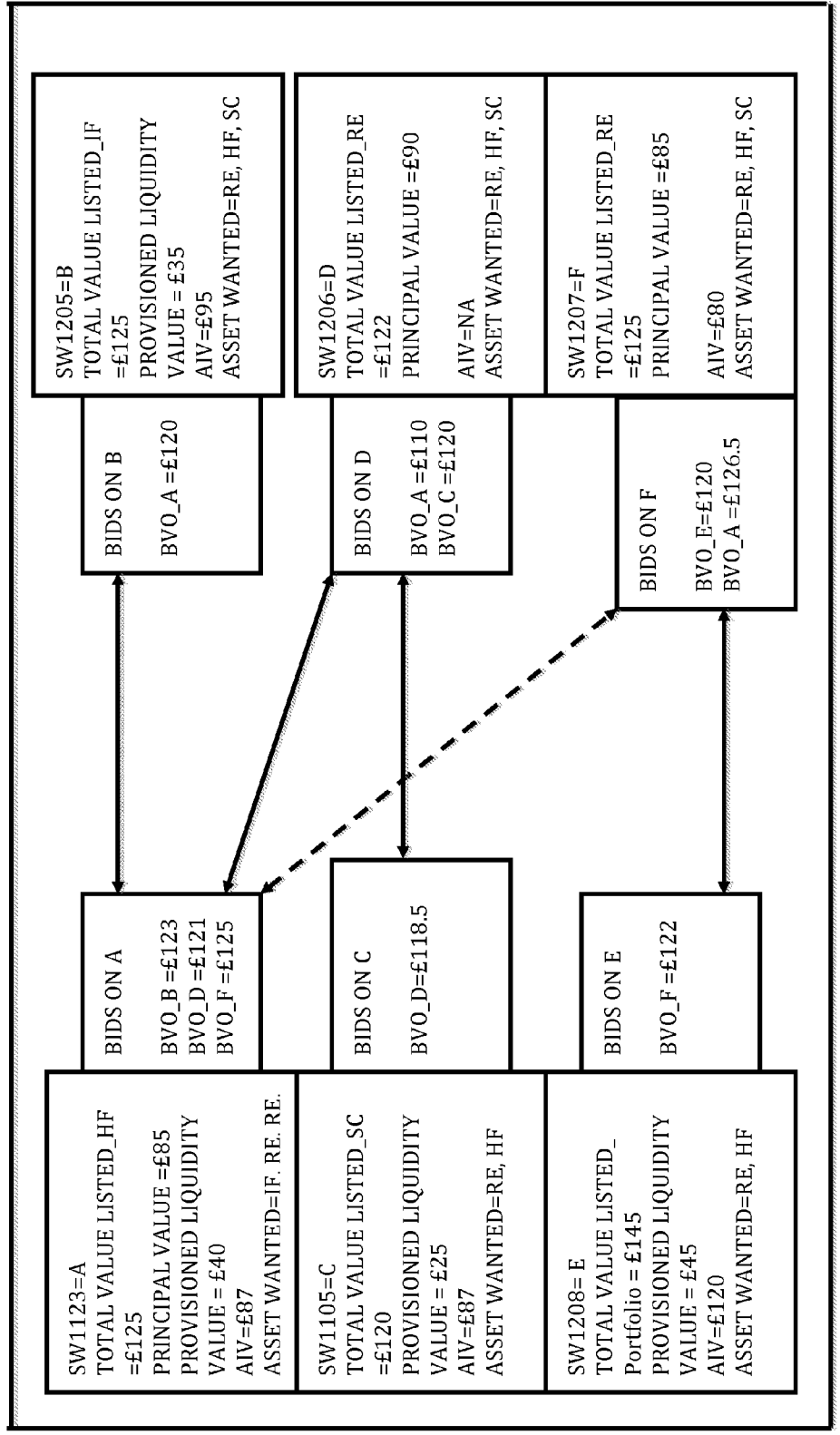
Figure 2A: A Bilateral Multi-Asset BVS Engine

FIG. 2B: Illustration of a Multi-asset BVS Trading Platform view.

| Asset listed | Product Code | Principal Value [£] | Provisioned Liquidity Value [£] | Total Value Listed [£] | AIV* [£] | Assets Wanted | BVO [£] | BVR [£] | BVS ∆ [£] | Bid Closing Date |
|---|---|---|---|---|---|---|---|---|---|---|
| HF | SW1123 | 85 | 40 | 125 | 100 | IF, RE, RE | 120 110 120 | 123, 121 125 | -3.0 -11.0 -5.0 | 12th Dec 2011 |
| SC | SW1105 | 95 | 25 | 120 | 87 | RE HF | 120 | 118.5 | 1.5 | 1st Feb 2012 |
| IF | SW1205 | 90 | 35 | 125 | 120 | HF, SC, RE | 123 | 120 | 3.0 | 10th Mar 2012 |
| RE | SW1206 | 90 | 32 | 122 | NA | HF SC RE | 121 118.5 | 110 120 | +11.0 -1.5 | 31st Jan 2012 |
| RE | SW1207 | 85 | 40 | 125 | 80 | RE, HF, SC | 125 122 | 120 126.5 | 5.0 -4.5 | 15th Feb 2012 |
| Portfolio | SW1208 | 100 | 45 | 145 | 120 | RE, HF | 126.5 | 122 | +4.5 | 19th Mar 2012 |

* AIV = Independent Average Value, NA = Not Available,

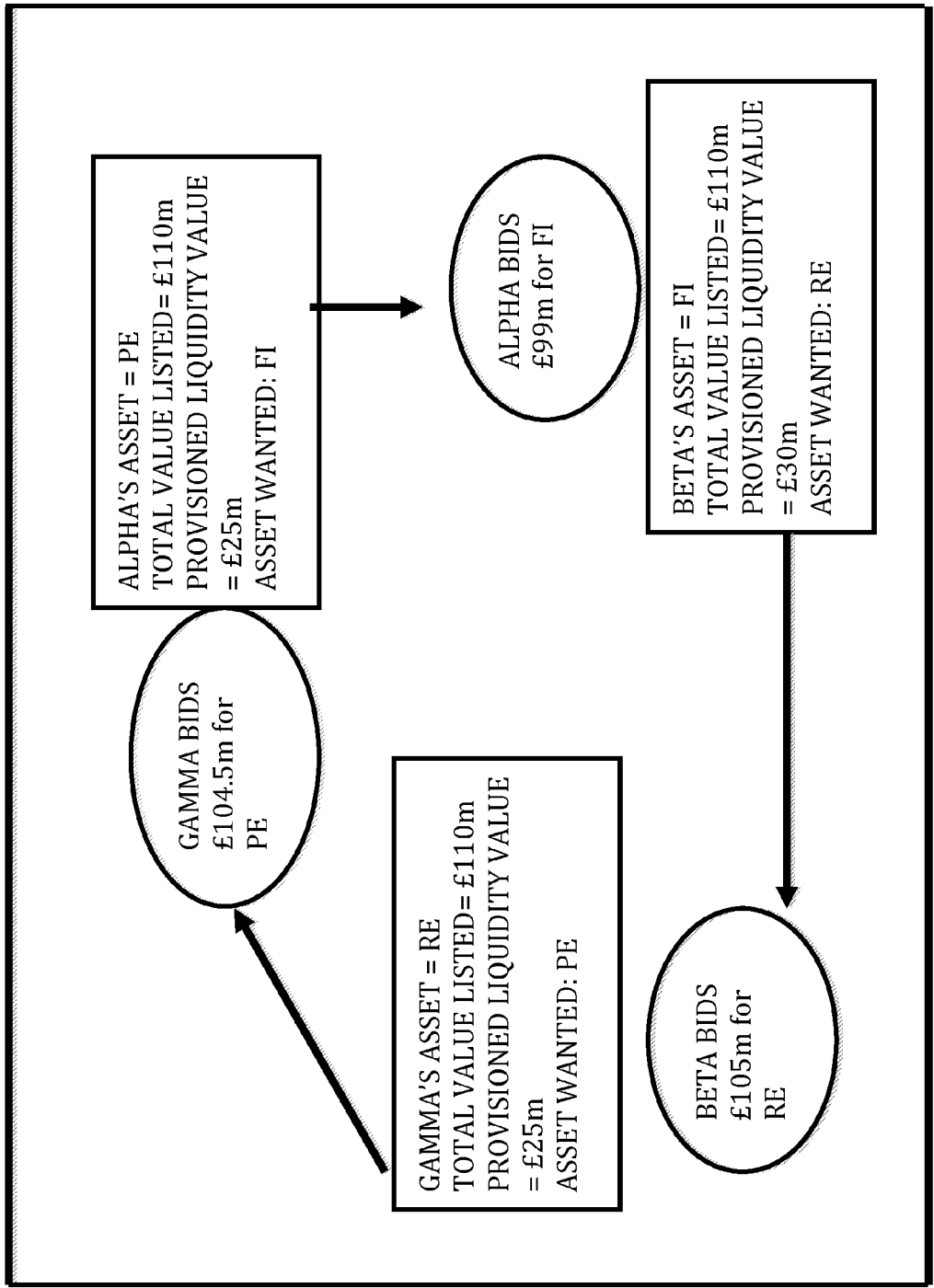
Figure 3A: 3-way (TRIPARTY) BVS Engine.

FIG 3B

| Asset Listed | Product Code | Principal Value | Provisioned liquidity Value | Total Value Listed | AIV* | Asset Wanted | BVO | BVR | BVS ▽ | Bid Closing Date |
|---|---|---|---|---|---|---|---|---|---|---|
| PE | Alpha | £85m | £25m | £110m | £83m | FI | £99m | £104.5m | -£5.5m | 1st Jan 2012 |
| FI | Beta | £80m | £30m | £110m | £88m | RE | £105m | £99m | +£6m | 31st Dec 2011 |
| RE | Gamma | £85m | £25m | £110m | £87m | PE | £104.5m | £105m | -£0.5m | 1st Feb 2012 |

A computer implementation of one embodiment of the invention

FIG. 5

A database structure of one embodiment of the invention

| Market Category | Deal Id Or Investor ID | Supporting Documents | Principal Value | Provisoned Value | Total Value Listed | AIV* | Asset Wanted | BVO | BVR | BVS | Bid Time Entry | Make a bid | Closing TIME To Swap |
|---|---|---|---|---|---|---|---|---|---|---|---|---|---|
| PE RE | Alpha | NDA, No NDA | 85m | 15m | 100m | 83m | RE | | 104.5m | ▽ -5.5m | START STOP | ☞ | 4 hours |
| FI PE | Beta | NDA | 80m | 20m | 100m | 88m | RE | 99m | 99m | +6m | | ☞ | |
| RE FI | Gamma | NDA | 85m | 15m | 100m | 87m | FI PE | 105m 104m | 105m | -0.5m | | ☞ | 10 hours |

FIG. 6

Institutional Real Estate Market

Bilateral Bid Value Swap:

INSTITUTIONAL REAL ESTATE MARKET

| Asset Type | Product Code | Principal Value | Provisioned Liquidity Value | TVL | AIV | Asset Wanted | BVO | BVR | BVS | Bid Date End | * |
|---|---|---|---|---|---|---|---|---|---|---|---|
| Office | 1003190153 | £100 | £250 | £350 | £100 | LIMITED PARTNERSHIP PE FUND | £340 | £305 | £35.0 | Nov 30, 2011 | View |
| Office | 1003190891 | $110 | $250 | $360 | $100 | RETAIL | $900 | $800 | $100.0 | Nov 30, 2011 | View |
| Logistics | 1003338470 | $210 | $67 | $277 | $200 | RESIDENTIAL | 0 | $2,100 | $-2100.0 | Nov 30, 2011 | View |
| Leisure | 1004246829 | $213 | $123 | $336 | $200 | MIXED USE | $336 | $467 | $-131.0 | Nov 30, 2011 | View |
| Mixed Use | 1004253524 | $1,000 | $7,889 | $8,889 | $1100 | STRUCTURED CREDIT | $2,100 | 0 | $2,100.0 | Nov 30, 2011 | View |
| Office.... | 1005035402 | $350 | $500 | $850 | $400 | INDUSTRIAL | $800 | $900 | $-100.0 | Dec 31, 2011 | View |
| Residential | 1005035932 | £200 | £400 | £600 | £150 | LOGISTICS | $550 | 0 | $550.0 | Dec 31, 2011 | View |

FIG. 8

BID BLOTTER

| Bid Blotter | | | | | | |
|---|---|---|---|---|---|---|
| Date Offered | Market Category | Asset ID | TVL | BVO | BVR | BVS |
| Nov 11, 2011 7:36:13 PM | IREM | 1004253524 | $295 | 0 | $210 | $-210.0 |
| Oct 26, 2011 9:19:12 AM | IREM | 1003190153 | £100 | $135 | £140 | $-25.0 |
| Oct 26, 2011 9:04:46 AM | IREM | 1003783138 | £277 | 0 | £175 | -£175.0 |
| Oct 24, 2011 5:46:45 PM | IREM | 1003114154 | $554 | 0 | $500 | $-500.0 |
| Oct 21, 2011 10:24:40 PM | IREM | 1003190152 | £300 | £281 | £245 | £36.0 |
| Oct 18, 2011 2:44:22 PM | IREM | 1003190891 | $360 | $300 | $500 | -$200.0 |
| Oct 17, 2011 7:31:11 PM | IREM | 1003190151 | £200 | £182.5 | £150 | £32.50 |
| 8 Offer's Found | | | | | | |

FIG. 9

Exchange Bid Ticket

Asset Offered: Longevity Note

Asset ID: 470

Total Value Listed: $277

Bid Value Received: £250

Principal Value: $210
Provisioned-Liquidity Value: $67
Asset Wanted: IREM: Office

Workspace and Pre-Trade Information:

Enter Workspace

Offeror Bid:

My Offered Asset Information:

Asset Offered: IREM: Office
Asset ID: 153
Principal Value: £300
Provisioned-Liquidity Value: £30
Total Value Listed: £330
Asset Wanted: Longevity Note

Exchange Bid to Swap: Enter Your Bid £:

Exchanged Bid-to-Swap

SYSTEM FOR TRADING ILLIQUID ASSETS BY LIQUIDITY PROVISIONING AND BID VALUE SWAP (FINANCIAL CONDUCTIVITY)

CROSS-REFERENCE TO RELATED APPLICATIONS

This is a utility application based upon U.S. patent application Ser. No. 61/422,082 filed on Dec. 10, 2010. This related application is incorporated herein by reference and made a part of this application. If any conflict arises between the disclosure of the invention in this utility application and that in the related provisional application, the disclosure in this utility application shall govern. Moreover, the inventor incorporates herein by reference any and all patents, patent applications, and other documents hard copy or electronic, cited or referred to in this application.

BACKGROUND OF THE INVENTION (1) Field of the Invention

The invention generally relates to financial trading systems. More particularly, the invention relates to means and methods of increasing the liquidity of illiquid financial assets and systems by anonymously exchanging bids in such assets. The same principle is also extended to cover illiquid non-financial assets.

(2) Description of the Related Art

Other systems of facilitating financial transactions are known in the art. For example, U.S. Pat. No. 7,567,928 issued on Jul. 28, 2009, assigned to JP Morgan Chase Bank, N.A. discloses a synthetic financial instrument labeled "Total Fair Value Swap" which comprises an agreement between entities regarding streams of cash payments based upon various interest rate factors. Unfortunately, the prior art fails to accommodate or even account for the vast majority of entities that hold assets of an illiquid nature. Neither does it accommodate multiple bids to determine the eventual winner under pre-set rules.

U.S. Pat. No. 7,987,127 issued on Jul. 26, 2011, assigned to JP Morgan Chase Bank, N.A. is a divisional application of U.S. Pat. No. 7,567,928 referenced above. The '127 patent claims a system to calculate various payment amounts, but fails to provide an open forum for the exchange of assets.

U.S. Pat. No. 7,895,118 issued on Feb. 22, 2011 by Glodjo et al discloses a system of trading multiple items from a group of several items. Credit extending agents are used to facilitate transactions.

U.S. Pat. No. 7,882,019 issued on Feb. 1, 2011 by Toffey discloses a straight through processing trading platform to facilitate sales of fixed income instruments.

U.S. Pat. No. 7,882,011 issued on Feb. 1, 2011 by Sandhu et al discloses a database with various modules to facilitate auction transactions.

As holding cash as an asset is not a considered a prudent long term investment strategy due to factors such as inflation, currency devaluation, the prior art presumption of an entity holding cash for the long term is seldom a realistic premise. Assets other than cash hold their long-term value better but in most cases such assets are also illiquid. Thus, what is needed in the art is a method and system for increasing the liquidity of typically non-liquid assets or liquid assets that have become illiquid due to a downturn in the market. The prior art also lacks means or methods of anonymously matching multiple buyers and sellers desiring to exchange hybrid assets or assets infused or provisioned with liquidity.

BRIEF SUMMARY OF THE INVENTION

The present invention overcomes shortfalls in the related art by presenting an unobvious and unique combination and configuration of computer implemented systems, methods, electronic processors, specialized processors, servers, databases, computer readable media and electronic records.

Embodiments of the present invention overcome shortfalls in the related art by presenting means and methods of infusing liquidity into non-liquid assets, and then artfully adjusting and/or displaying bids and offers such that dissimilar assets may be efficiently exchanged on the spot rather than future basis. In one embodiment of the disclosed system, participants may view elements of offered and bidded assets and then adjust the composition of their own bids or offers to achieve a transaction. There is a long felt need in the market for such a system, as most investors are asset rich and cash poor. The additional burden of new regulation notably Core Tier 1 Capital Requirements in Basle III makes the need for such an invention even more compelling.

One of the main advantages of this invention is the ability of the disclosed computer-implemented system to accept, augment and account for classic asset attributes such as intrinsic value, growth value, and other attributes. Certain techniques within certain embodiments of the invention are sometimes labeled financial conductivity or financial doping and are more fully described below.

In one contemplated embodiment of the invention, the term bid value swap is used to measure the differential between competing bids and offers; with the mathematically absolute lowest differential or bid value swap value being the winning bid to a corresponding offer. In contrast to the related art, bidders adjust the composition and magnitude of theirs bids to closely match the value of the offered asset. Embodiments of the invention contemplate both offers and bids comprising fixed assets and/or assets infused with liquidity. The term hybrid asset is sometimes used to describe an illiquid asset enhanced, injected, provisioned or infused with liquidity.

These and other objects and advantages will be made apparent when considering the following detailed specification when taken in conjunction with the drawings.

BRIEF DESCRIPTION OF THE DRAWINGS

FIG. 1A is a diagram outlining one embodiment of a single asset bilateral bid value swap FIG. 1B is a table presenting a trader's view of one embodiment of a bilateral bid value swap trading platform.

FIG. 2A is a diagram outlining one embodiment of a bilateral multi-asset bid value swap.

FIG. 2B is a table illustrating one possible trader's view of a bilateral multi-asset bid value swap trading platform.

FIG. 3A is a diagram of one possible 3-way bid value swap using a single asset type.

FIG. 3B is a table illustrating one possible trader's view of a 3-way bid value swap trading platform.

FIG. 5 is one possible database structure implementing one function of one possible embodiment of the invention.

FIG. 6 depicts an institutional real estate market listing of bilateral bid value swaps.

FIG. 8 depicts a bid blotter

FIG. 9 depicts an exchange bid ticket.

Figure 4:
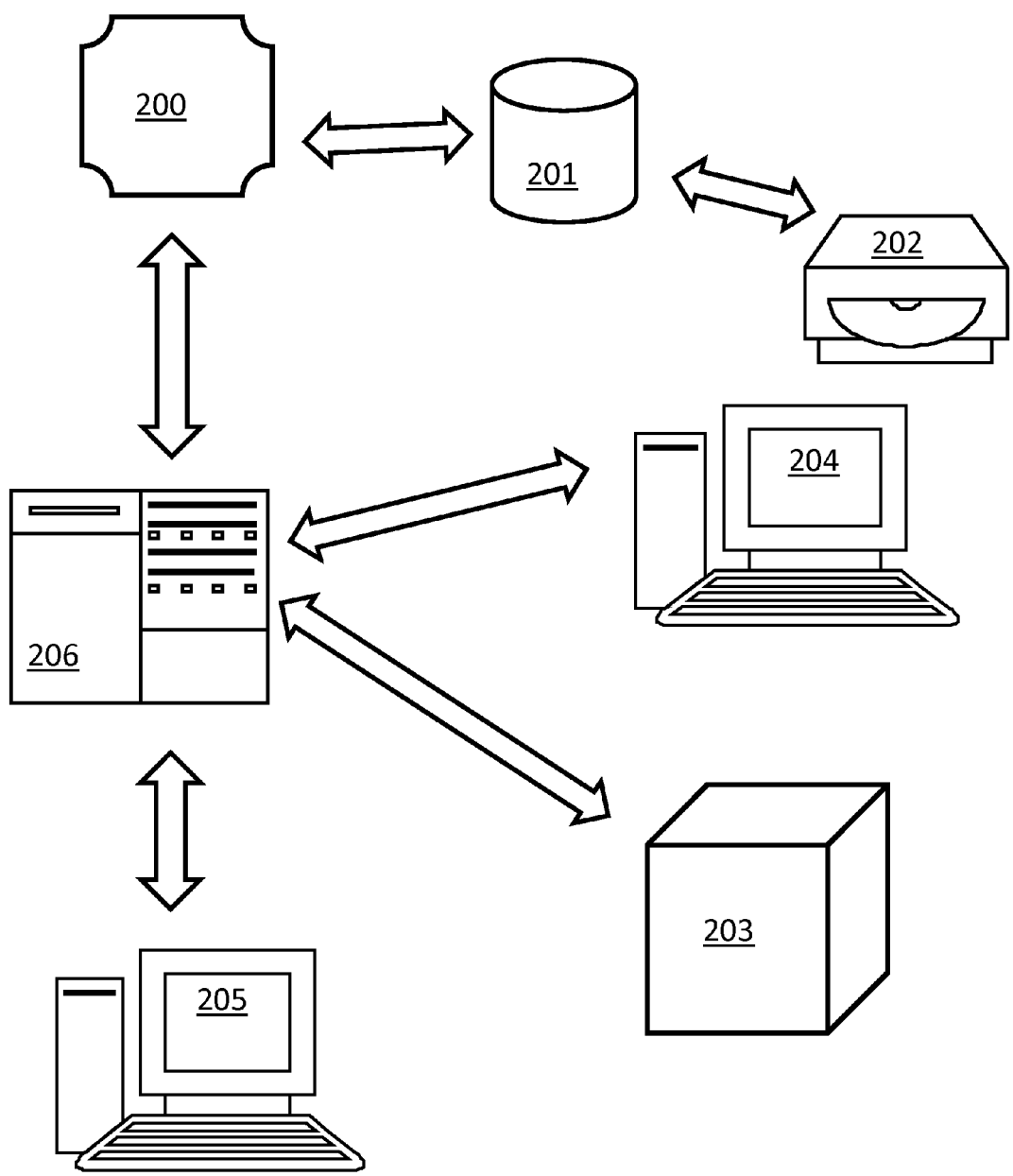
FIG. 4 is a diagram of one possible computer implementation of one possible embodiment of the invention.

REFERENCE NUMERALS IN THE DRAWINGS 200 processor
201 database
202 data storage device
203 servers in communication
204 computer system and/or client application
205 computer system and/or client application
206 central processing and storage for trading system

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

Background Related to Financial Conductivity

Embodiments of the disclosed invention are sometimes referred to as Bid Value Swap and/or financial conductivity. One objective of the invention is to present a computer implemented system to enable arm's length transactions between unrelated third parties wherein formally illiquid assets are exchanged. In such exchanges, cash or other liquid assets are used to bridge the gap in the value of the formerly illiquid assets.

In order to appreciate certain aspects of various embodiments of the invention a brief summary of traditional and new financial principles and concepts may be helpful.

Every asset has a basic value, sometimes called its intrinsic value. An intrinsic value, more formally defined below, is not derived by market supply and demand forces, but is calculated by the cost of recreating or replacing a similar asset. For example, the intrinsic value of vehicle would be the replacement cost or the cost of manufacturing a similar vehicle.

The growth value of an asset is more carefully describe below, but can be thought of as a value created by supply and demand or market conditions.

As a result of current market conditions, such as a shortage of credit and/or other factors, the principal value of some assets has dropped precipitously and by a greater amount than what can be explained by current supply and demand conditions for the subject asset. This precipitous drop of principal value for some assets has sometimes herein been responsible for the "disconnectivity" between the operational performance and the valuation of the asset and we believe this may be attributed in part to the bundled manner in which assets are valued, without separating the intrinsic value from the growth value of the asset.

Embodiments of the present invention present a restorative system of "financial conductivity" to cure the "disconnectivity" described above and currently being experienced in our waning economy. In a growing economy, the growth value of most assets usually rises above its intrinsic value and in some cases the growth value can become significantly higher and measured in multiples of the intrinsic value. But, in a declining or waning economy, the growth value of most assets decline and in some cases reach a zero value. Unfortunately, the wider market does not separate the absence of growth value from the intrinsic value of the asset resulting in a collapse of deal activity due in part to wide prize dislocation in principal value between the buyer and seller.

Thus, in a declining market the intrinsic value of an asset is not separately recognized by the market and the asset value becomes disconnected from the operational value. The situation is sometimes exacerbated by assets that are neither listed nor traded on a recognized exchange.

In one embodiment, a system and technique of financial conductivity comprises three stages to cure the principal value disconnectivity by creating a financially conducting or liquid asset from two or more illiquid assets. The transformation of assets from an illiquid to a liquid form solves a real world problem faced by many organizations and individuals who are unable to conveniently and quickly convert assets into cash. Lehman Brothers who failed to sell their assets in time to raise cash to pay certain obligations faced such a problem. Many investors feel the need for the present invention, but for the rare exception of those investors who have sufficient cash on hand and hence have no need to sell assets. Simply stated, those who possess assets that fail to meet their need for cash need means to convert their illiquid assets into liquid assets. Embodiments of the present invention meet this long felt shortfall in the prior art.

Three stages of one embodiment of the invention may be described as follows:

1) Establishing a principal value of the illiquid asset. The principal value is the sum of the intrinsic value and the growth value.

2) Injecting a liquid asset as the doping agent to the illiquid asset. This process is called "financial doping", "asset liquidity enhancement", liquidity infusion or other terms and produces a semi-liquid asset, infused asset or hybrid asset. The doping agent, liquidity agent or infusion agent may be cash, bonds, or other liquid assets or instruments and originates from the provisioned liquidity during listing.

3) Applying a mathematical difference operator to the bid value of the semi-liquid asset with respect to another semi-liquid asset to generate the required liquidity of both assets. This bidding process is called bid value swap (BVS).

Definitions Related to Financial Conductivity

Financial conductivity: A process wherein illiquid financial assets are transformed into liquid assets and theoretically results in infinite liquidity. In one embodiment, financial doping, liquidity infusion or liquidity enhancement is used to create two or more sets of semi-liquid assets owned by two or more holders of illiquid assets. The two or more sets of semi-liquid assets may be traded with each other through two disclosed bidding processes, based on the Bid Value <BV> of the semi-liquid assets, called Forward-Bid-to-Swap and Exchange-Bid-to-Swap to create readily negotiable or liquid assets for both holders of the illiquid assets.

Financial doping, liquidity provision, liquidity infusion, liquidity enhancement is also known as injected-liquidity: In one embodiment, financial doping or liquidity infusion adds units of liquid instruments (including cash) to the illiquid asset, thus converting the illiquid asset into a semi-liquid asset. Financial doping or liquidity infusion may entail the use of liquid instruments such as cash or other highly liquid instruments. Liquid instruments to be added can be measured in absolute value if the value of the illiquid asset is unknown or not available or in percentage units of the intrinsic or principal value of the illiquid asset if such value is known.

Bid Value Swap (<BVS>): The difference in the Bid Value (<BV>) of two or more assets involved in a swap or trade. For example, for two semi-liquid assets labeled A and B, the Bid Value Swap or <BVS> would equal:

$$<BV\_[A]>-<BV\_[B]>$$

In a Bid Value Swap trade with many open anonymous bids and offers, the matched pair with the smallest difference or <BVS> in absolute terms wins the trade. A negative (−ve) <BVS> means the asset holder receives the difference as premium while positive (+ve)<BVS> means the holder pays a premium as shown in FIGS. 1B, 2B and 3B. The reasoning is based on comparing the revenue against expense. If the revenue earned is more than expense then a differential liquidity premium is received and the opposite is true. Furthermore if two bids are received, the bid with the absolute lower bid value swap is ranked higher than the bid with a higher bid value swap in settling the trade. This is in conformity with the bid value swap objective of minimize the cash outlay of the bidders.

A private trade is conditioned upon a request from both asset holders, otherwise the proposed transaction will be considered an open trade as illustrated in the table below:

| TYPE OF LISTING | TYPE OF LISTING | BID VALUE SWAPPING MODE |
| --- | --- | --- |
| OPEN | OPEN | OPEN |
| PRIVATE | OPEN | OPEN |
| PRIVATE | PRIVATE | PRIVATE |

TVS Listing Options

Total Value Listed [TVL]: of a semi-liquid asset is the sum of the principal value and the injected liquidity Value Principal Value: is the sum of the intrinsic value and growth value Injected Liquidity Value or Provisioned Liquidity Value, or liquidity infusion value: is the maximum amount of cash or value of liquid instrument the member is willing to add to the illiquid asset to make the combined asset semi-liquid. Provisioned, Doping or liquidity infusion value defines the depth of liquidity of the semi-liquid asset. A safe guard presented herein under the rubric of financial doping or liquidity infusion is that there can be no instance where a bidder is required to honor more than their Injected, Provisioned or liquidity infusion value in cash or other liquid instruments at the close of the proposed transaction. And there can be no instance where the bidder can bid more than the total value listed. Furthermore, if two bids are received, the bid with the higher Injected Liquidity or provisioned liquidity is considered a higher liquidity risk than that with a lower Injected Liquidity Value.

Cash (or Liquidity) Balance: is the actual cash amount an investor is committed to pay or receive in exchange for another asset and in theory the cash balance cannot be more than the financial doping or injected liquidity value. Consequently the optimum cash balance is the doping or injected liquidity value. The two assets can be denominated in the same or different convertible currencies. If the same currency then the Cash (or Liquidity) Balance will be in the same currency otherwise the Cash (or Liquidity) Balance will be US Dollar as reference currency.

Growth value is the anticipated demand of the good and service provided by the assets. Growth value captures the future value of the asset and largely determined by market conditions.

Intrinsic value is the steady state operational value or present value of the asset derived from discounted future cash flows over a minimum of three or more valuation frequency periods; usually three or more quarters if valued quarterly into perpetuity.

Referring to FIG. 1A, a single asset <BVS> is presented where one type of asset is exchanged for another single type of asset in an asset-pair market. In a single asset <BVS>, a bilateral, trilateral, quadrilateral up to an nth-way BVS is contemplated and establishes is the basis of financial conductivity as we can theoretically generate infinite but controlled liquidity. In practice, however, our initial focus is on the bilateral and trilateral single mode BV swaps and with automation, the number of modes can be increased to quadrilateral (four) or more BVS modes generating an infinite number of permutations corresponding the different modes of scarce liquidity.

FIG. 1B presents a table of a trader's view of a bilateral BVS trading platform. In the displayed embodiment, RE means real estate and FI means fixed income financial instrument.

Referring to FIG. 2A, a multi-asset BVS is shown wherein one type of asset may be exchanged for two or more types of assets and vice versa. FIG. 2A may also be considered to be an illustration of a contemplated multi-asset liquidity engine. FIG. 2A shows that In order to increase the range of liquidity in the market, we can also have multi-asset bid value swap in which a single asset can be swapped for multiple assets and vice versa and by so doing so broaden the asset liquidity options.

Referring to FIG. 2B, a multi-asset BVS Platform view is presented.

Referring to FIG. 3A, a trilateral or tri-party single asset Bid Value Swap is illustrated. The member listing the asset always sets the parameters of the trade and selects the trading mode as OPEN or Private. In a typical <BVS> trade, all matched and unmatched bids are always displayed together in the bid blotter. The Closing time of a transaction is the earlier of the two times to swap.

FIG. 3A shows that a Single Asset bid value swap can also be undertaken in 3-way process. In a three-way BVS (3-SBVS), three bidders are required to complete the trade in any currency as illustrated in FIG. 3. In a 3 way BVS, every bidder undertake due diligence on assets wanted as though they were buying the asset outright on cash basis. In other words there is only a Forward-bid-to-swap and no exchange bid to swap between any two parties. The bidding is completed by earliest date in the loop, or an embodiment of the invention, will determine the winning trio using the pre-set criteria of minimum absolute Bid value swap.

In other words, FIG. 3A shows that a Bid value swap can also be 3-way, wherein in a three-way BVS (3-BVS), three bidders are required to complete the trade in any currency as illustrated in FIG. 3A. The advantage of our BVS solution is that every bidder undertake due diligence on assets wanted as though they were buying the asset outright on cash only basis. The tri-party bidding is completed by the earliest date in the loop, the system will determine the winning trio using the pre-set criteria of minimum absolute bid value swap.

Referring to FIG. 3B, a 3-WAY <BVS> Platform view is presented. FIG. 3B shows a sample BVS or Bid Value Swap illustration wherein Beta will pay £6 m to be shared as £5.5 m to Alpha and £0.5 m to Gamma through a clearing agent. This is because Beta is biding more in value than the Value it is receiving for its asset sale. Therefore –ve is an account credit and +ve is an account debit.

In one embodiment, an application of a Bid value bidding may be illustrated as follows:
The total value listed (TVL) of any asset in a swap is defined as:

$$<TVL[Asset]>=Principal\ (or\ Intrinsic)\ Value+Provisioned\text{-}Liquidity\ (or\ Doping)\ Value \qquad \text{Equation No. 1.}$$

For any asset, <BVO>=Bid Value Offered and <BVR> is the Bid Value Received.
For any asset pair, there are two types of bids: One bid entry is through a Forward-Bid-to-Swap and a second entry is an Exchange-Bid-to-Swap. On the basis of relativity, both bids can interchangeably be BVO and BVR at the same time in a trading process.
BILATERAL BV BIDDING using FIXED INCOME (FI) and REAL ESTATE (RE) assets thus:
If a Fixed Income (FI) is to be swapped for a Real Estate (RE), then $$<BVO>[RE]=Principal\ Value[RE]+Injected\ Liquidity\ Value \qquad \text{Equation No. 2}$$

This bid is referred to as a forward-bid-to-swap in the actual bidding process. However, this FORWARD-BID-TO-SWAP will hence become the BVR from the REFERENCE POINT of the FI asset.
There will also be a reciprocal (s) BV bid Received for the FI asset thus:

$$<BVR>[FI]=Principal\ Value[FI]+Injected\text{-}Liquidity\ Value \qquad \text{Equation Number 3.}$$

This is referred to as exchange-bid-to swap in the actual bidding process. THE EXCHANGE BID-TO-SWAP will become the BVO from the reference point of the RE asset.

FIG. 4 presents one contemplated embodiment of the invention wherein a central server and data storage unit 206 acts as the hub for the implementation of auctions and other actions. Actual transactions may occur off site via communicating servers 203. Bidders and sellers may use their own web access points or computers 204 and 205 to access the main system 206.

A data storage device 202, database 201 and processor 200 may be used by the system 206 to look up data needed to facilitate auctions and other transactions.

FIG. 5 represents one possible database structure that may be stored with in the components of FIG. 4.

FIG. 6 presents a pseudo screen shot of the institutional real estate market, bid value swap exchange for assets. The second row sets the following example:
An office building has a product code of 1003190891 is listed with a principal value of £100 and a Provisioned Liquidity or Doping value of £250 resulting in a total value listed of £350. The asset wanted by the bidder is a Limited Partnership PE Fund. The bid value offered or BVO offered for the PE Fund is currently £340 and the bid value received or BVR for the Office building is £305. The differential value of BVO and BVR of £35.0 is shown as the bid value swap or BVS. Underneath the view is a bid blotter showing any other bids/offers for the same office.

Figure 7:
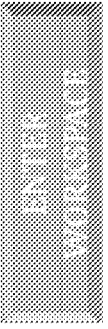
FIG. 7 depicts a forward bid ticket.

FIG. 7 presents a pseudo screen shot of a forward bid ticket. FIG. 7 a total value listed of $336. This total value listed could be considered a hybrid value or infused value as the figure includes a principal value of $213 and a provisioned, injected, infusion liquidity value or doping value of $123. The real estate property listed is shown having a LTV or loan to value ratio of 67%.

FIG. 8 presents a pseudo screen shot of a bid blotter showing the range of BVR bids and BVO offers for the asset in FIG. 7

FIG. 9 presents a pseudo screen shot of an Exchange Bid Ticket. The total value listed of $277 comprises a principal value of $210 and a Provisioned Liquidity Value or infusion value of $67.

Embodiments of the Invention Include:
1. A system for infusing illiquid assets with liquid assets to create infused assets and for auctioning infused assets, the system comprising:
a liquidity infusion processor being configured to:
accepts and populate data fields with attributes related to an illiquid asset and being capable to accept and populate data fields with attributes related to a liquid asset; create an infused asset by infusion of a liquid asset into an illiquid asset;
executing a bid value swap auction wherein multiple bidders and offerors present illiquid, liquid and infused assets for trade and wherein trades occur between bidders and offerors presenting infused assets of the closest values; and
a database maintaining electronic records of bidder and offeror illiquid assets, liquid and infused assets.
The system above wherein the liquidity infusion processor or bidder adjusts liquid attributes of bids or offers to create more closely matched bids and offers.
A method of infusing illiquid assets with liquid assets and of auctioning assets in a bid value swap, the method comprising:
infusing an illiquid asset with a liquid asset to create a new infused asset;
accepting bids and offers of infused assets and topping off bids and offers such that bids and offers will have a matched valuation;
executing trades between bidders and offerors present assets of matched value.
The method above where trades are executed without topping off bids and where offered and bid assets are most closely matched.
The method above using the system described above.
A system for infusing liquid assets into illiquid assets to create infused (semi-liquid) assets and for trading infused (semi-liquid) assets, the system comprising:
a liquidity infusion processor being configured to:
accept and populate data fields with attributes related to an illiquid asset (s), asset wanted and being capable to accept and populate data fields with attributes related to a liquid asset;

create an infused asset by infusion of a liquid asset into an illiquid asset;

executing a bid value swap auction wherein multiple bidders and offerors present illiquid, liquid and infused assets for trade and wherein trades occur between bidders and offerors presenting infused assets of the closest values; and a database maintaining electronic records of bidder and offeror illiquid assets, liquid and infused assets.

The system above wherein the liquidity infusion processor adjusts liquid attributes of bids or offers to create more closely matched bids and offers.

A method of infusing liquid assets into illiquid assets and of auctioning assets in a bid value swap, the method comprising:

infusing a liquid asset into an illiquid asset to create a new infused (or semi-liquid) asset;
accepting bids and making offers of infused assets; and
executing trades between bidders and offerors presenting infused assets of closest value and topping off bids and offers with liquid assets such that winning bid and offer will have matched valuation.

The method above where trades are executed without topping off bids or offers and exchanges are executed where offered and bided assets are matched.

The method above using a system for infusing liquid assets into illiquid assets to create infused assets and for auctioning infused assets, the system comprising:
a liquidity infusion processor being configured to:
accept and populate data fields with attributes related to an illiquid asset and being capable to accept and populate data fields with attributes related to a liquid asset;
create an infused asset by infusion of a liquid asset into an illiquid asset;
executing a bid value swap auction wherein multiple bidders and offerors present illiquid, liquid and infused assets for trade and wherein trades occur between bidders and offerors presenting infused assets of the closest values; and
a database maintaining electronic records of bidder and offeror illiquid assets, liquid assets and infused assets.

What is claimed is:

1. A system for infusing liquid assets into illiquid assets to create infused (semi-liquid) assets and for trading infused (semi-liquid) assets, the system comprising:
   a) a liquidity infusion processor being configured to:
      i. accept and populate data fields with attributes related to an illiquid asset (s), asset wanted and being capable to accept and populate data fields with attributes related to a liquid asset;
      ii. create an infused asset by infusion of a liquid asset into an illiquid asset;
      iii. executing a bid value swap auction wherein multiple bidders and offerors present illiquid, liquid and infused assets for trade and wherein trades occur between bidders and offerors presenting infused assets of the closest values; and
   b) a database maintaining electronic records of bidder and offeror illiquid assets, liquid and infused assets.

2. The system of claim 1 wherein the liquidity infusion processor adjusts liquid attributes of bids or offers to create more closely matched bids and offers.

3. A method of infusing liquid assets into illiquid assets and of auctioning assets in a bid value swap, the method comprising:
   a) using a liquidity infusion processor for infusing a liquid asset into an illiquid asset to create a new infused (or semi-liquid) asset;
   b) using servers in communication with the liquidity infusion processor for accepting bids and making offers of infused assets; and
   c) using servers in communication with the liquidity infusion processor for executing trades between bidders and offerors presenting infused assets of closest value and topping off bids and offers with liquid assets such that winning bid and offer will have matched valuation.

4. The method of claim 3 wherein trades are executed without topping off bids or offers and exchanges are executed where offered and bided assets are matched.

5. A method of using a processor and database for infusing liquid assets into illiquid assets to create infused assets and for auctioning infused assets, the method comprising:
   a) using a liquidity infusion processor being configured to:
      i. accept and populate data fields with attributes related to an illiquid asset and being capable to accept and populate data fields with attributes related to a liquid asset;
      ii. create an infused asset by infusion of a liquid asset into an illiquid asset;
      iii. executing a bid value swap auction wherein multiple bidders and offerors present illiquid, liquid and infused assets for trade and wherein trades occur between bidders and offerors presenting infused assets of the closest values; and
   b) using a database maintaining electronic records of bidder and offeror illiquid assets, liquid assets and infused assets.

6. The method of claim 5 wherein the liquidity infusion processor adjusts liquid attributes of bids or offers to create more closely matched bids and offers.

\* \* \* \* \*